United States Patent Office 3,442,983
Patented May 6, 1969

3,442,983
MODIFIED POLYOLEFIN PHOSPHITE WAXES AND PROCESS FOR PREPARING THE SAME
Isaac J. Levine, East Brunswick, and Arthur K. Ingberman, Somerville, N.J., assignors to Union Carbide Corporation, a corporation of New York
No Drawing. Filed July 6, 1965, Ser. No. 469,890
Int. Cl. C07f 9/08; C08f 27/00; C09g 1/10
U.S. Cl. 260—932          12 Claims

ABSTRACT OF THE DISCLOSURE

Adducts of a polyolefin wax having olefinic double bonds and an alkyl phosphite having a hydrogen atom capable of entering into an addition reaction with the olefinic double bonds, and such adducts wherein the oxyalkyl groups attached to phosphorus atoms are converted to hydroxyl groups. In the process, a polyolefin wax is reacted with an alkyl phosphite and the oxyalkyl groups are converted to hydroxyl groups by pyrolysis.

---

This invention relates to polyolefin waxes emulsifiable to fine particle size, stable emulsions. More particularly, this invention relates to modified polyolefin waxes which are readily emulsifiable in aqueous media to fine particle size, stable emulsions, to a process for preparing these modified polyolefin waxes, and to emulsions prepared therefrom.

Heretofore, emulsifiable polyolefin waxes have been prepared by oxidation or by adducting polyolefin waxes with polar compounds such as maleic anhydride, thioglycolic acid, and the like. Oxidation, however, is a random reaction that produces a variety of products that are usually undesirably colored and have objectionable odors. Adduction with polar compounds also suffers from serious drawbacks. For example, the adduction with maleic anhydride is a very high temperature reaction that requires long heating times leading to some decomposition of the maleic anhydride. Moreover, during the reaction some of the molecules are made longer by copolymerization and oxidative crosslinking. After emulsification, there is a tendency toward instability and breaking of the emulsion or "creaming." While many of the problems met with maleic anhydride are obviated through the use of thioglycolic acid, the high cost and unpleasant odor of this acid render its adducts with polyolefin waxes unsuitable for commercial use.

It has also been proposed to produce an emulsifiable polyethylene wax by thermally degrading a high molecular weight linear polyethylene at a temperature of from 150° to 400° C. in the presence of an organic phosphite to form an addition product having an average molecular weight of from 200 to 4,000. However, there are several drawbacks to this approach and the products produced thereby. For example, the thermal degradation of high molecular weight linear polyethylene in the presence of an organic phosphite requires impractically long reaction times and causes the organic phosphite, which is markedly unstable at polyethylene thermal degradation temperatures, to decompose to phosphine and related by-products, which are malodorous and toxic. Kosolapoff, Organophosphorus Compounds, John Wiley & Sons, Inc., New York (1950), p. 182. Moreover, the product produced is undesirably colored and while emulsifiable yields a poorly colored emulsion.

It is therefore an object of this invention to provide a process for preparing a readily emulsifiable modified polyolefin wax.

It is another object of this invention to provide an improved process for preparing an improved adduct of a polyolefin wax and an alkyl phosphite.

It is another object of this invention to provide modified polyolefin waxes emulsifiable to fine particle size, stable emulsions.

It is yet another object of this invention to provide fine particle size, stable emulsions of modified, polyolefin waxes.

Broadly, the process of this invention for preparing readily emulsifiable polyolefin waxes comprises reacting a polyolefin wax having an average of at least about one-half of an olefinic double bond per polymer molecule and a molecular weight of about 1,000 to about 5,000 with an alkyl phosphite to form an adduct thereof containing carbon-to-phosphorus bonds and thereafter converting at least about 25% of the oxyalkyl groups attached to the phosphorus atoms to hydroxyl groups to form a readily emulsifiable modified polyolefin wax-phosphite adduct. This product can then be emulsified in a conventional manner to prepare polyolefin wax emulsions.

The term "polyolefin" is used herein to denote normally solid homopolymers of alpha mono-olefinically unsaturated hydrocarbons as well as normally solid copolymers thereof. Suitable polyolefins include polyethylene, polypropylene, polyethylene-polypropylene copolymers and the like. Polyolefin waxes useful in this invention have an average of at least one-half, and preferably one, olefinic double bond per polymer molecule and a molecular weight of from about 1,000 to about 5,000. Preferred are crystalline polyolefin waxes. Polyolefin waxes typically contain at least one type of olefinic double bond and sometimes a combination of two or three different types of double bonds. A polyolefin wax molecule containing an olefinic double bond can be represented by the formula $RR_1C=CHR_2$ wherein R is an alkyl group and $R_1$ and $R_2$ each are hydrogen or an alkyl group. Where $R_1$ and $R_2$ are both hydrogen, the bond is termed a terminal vinyl type of double bond. Where $R_2$ is hydrogen and $R_1$ is an alkyl group, the bond is termed a vinylidene type of double bond and where $R_1$ is hydrogen and $R_2$ is an alkyl group, the bond is termed an internal type of double bond. All of these types of olefinic double bonds are capable of entering into an addition reaction with an alkyl phosphite as is described more fully herein.

Polyolefin waxes can be prepared by the pyrolysis or thermal degradation of higher molecular weight polyolefin polymers or by the direct polymerization of an olefin monomer or monomers to a wax of desired molecular weight. Pyrolysis, for example, can be carried out in a heated pyrolysis tube at about 450° to 600° C. Linear, high density polyethylene waxes having a density of 0.94 and above, when modified in accordance with this invention and then emulsified provide hard, highly polishable waxes and are preferred for this reason. Polyethylene waxes having lower densities, as well as other polyolefin waxes can also be modified according to this invention and thereafter formed into fine particle size, stable emulsions.

Suitable alkyl phosphites that can be reacted with polyolefin waxes to form an adduct thereof have at least one hydrogen atom capable of entering into a free radical addition reaction with an olefinic double bond and can be represented by the formula:

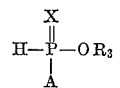

wherein X represents an oxygen or a sulfur atom, $R_3$ is an alkyl group having from 1 to 16 carbon atoms and A is hydrogen or $-OR_4$ wherein $R_4$ is an alkyl group having from 1 to 16 carbon atoms. Thus as used herein, the term "phosphite" refers to both phosphites and thiophosphites. It should be understood that when A is —OR$_4$, R$_3$ and R$_4$ can be the same or different alkyl groups. Suitable alkyl phosphites include methyl dihydrogen phosphite, ethyl dihydrogen phosphite, n-butyl dihydrogen phosphite, n-heptyl dihydrogen phosphite, n-hexadecyl dihydrogen phosphite, dimethyl hydrogen phosphite, diethyl hydrogen phosphite, dipropyl hydrogen phosphite, di-n-butyl hydrogen phosphite, di-n-octyl hydrogen phosphite, di-n-pentadecyl hydrogen phosphite, methyl ethyl hydrogen phosphite, ethyl decyl hydrogen phosphite, methyl dihydrogen thiophosphite, ethyl dihydrogen thiophosphite, n-undecyl dihydrogen thiophosphite, dimethyl hydrogen thiophosphite, diethyl hydrogen thiophosphite, di-n-butyl hydrogen thiophosphite, di-n-heptyl hydrogen thiophosphite, di-n-hexadecyl hydrogen thiophosphite and the like. Inasmuch as the alkyl thiophosphites produce a modified polyolefin wax having a typical mercaptan odor, and the alkyl dihydrogen phosphites can under certain conditions lead to crosslinking, the dialkyl hydrogen phosphites are preferred for purposes of this inveniton. These preferred phosphites have the formula:

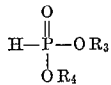

wherein R$_3$ and R$_4$ are as defined above. It should be noted that trialkyl phosphites are not suitable reactants in this invention because they do not have a hydrogen atom available to enter into a free radical addition reaction with the olefinic double bond present in polyolefin waxes. For a detailed discussion of the mechanism of the free radical addition reaction between alkyl phosphites of the class described herein and the olefinic double bond, reference is made to Stacey et al., Organic Reactions, 13, 218–225, John Wiley and Sons. Inc., New York (1963).

The adduct of a polyolefin wax as described herein and an alkyl phosphite can be prepared in a preferred method by blending the polyolefin wax and alkyl phosphite in the liquid phase, for example in the melt or in solution, and reacting them in the presence of a free radical addition reaction initiator with agitation at a temperature of from about 130° C. to about 200° C., preferably from about 150° C. to about 190° C. Blending and agitation can be carried out in any manner which insures intimate admixing of the reactants and good heat transfer throughout the reaction mass during the reaction time.

If the addition reaction is conducted in solution, the reaction medium should be liquid organic solvent inert with respect to the reactants under the reaction conditions and which is a solvent for the polyolefin wax and alkyl phosphite. Suitable solvents include benzene, cyclohexane, and the like, and halogenated hydrocarbon solvents such as chlorobenzene, ortho-di-chlorobenzene, 1,1,2-trichloroethane, bromobenzene, α-chloronaphthalene and the like. It is preferred to use only as much solvent as will completely dissolve the polyolefin wax and alkyl phosphite.

It is preferred to conduct the addition reaction in the melt by heating the polyolefin wax to its melting point and above and blending in the alkyl phosphite.

Generally an excess over the amount of alkyl phosphite theoretically necessary to react with the olefinic double bonds present in the polyolefin wax molecules should be used in order to achieve good rates of reaction and to insure complete reaction. A high reaction rate is not necessarily the sole factor in determining the optimum amount of alkyl phosphite to be used. For example, it is only required that about 25 percent, preferably 50 percent, or above of the olefinic double bonds be adducted to provide an ultimately emulsifiable product. Thus, the use of more alkyl phosphite than is required is unnecessary except to reduce the time needed to conduct the addition reaction.

The free radical addition reaction between the polyolefin wax and alkyl phosphite can be initiated by organic peroxides, organic azo compounds, ultraviolet radiation, and x-radiation. Stacey et al., supra, p. 219. Suitable organic peroxide initiators or catalysts include di-i-butyl peroxide, 2,5-dimethyl-2,5-di(t-butyl peroxy)hexyne-3, dicumyl peroxide, benzoyl peroxide, lauroyl peroxide, and the like. Suitable organic azo compounds include azonitriles such as azobisbutyronitrile and the like. In using ultraviolet radiation as the initiator, a photosensitizer such as benzophenone should be present. In one embodiment, it is preferred to admix alkyl phosphite and initiator prior to adding polyolefin wax.

The addition reaction between an olefinic double bond and an alkyl phosphite, and the adduct formed can be shown as follows:

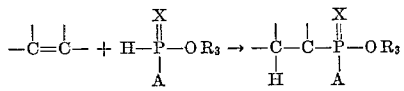

wherein A, R$_3$, and X are as defined previously, as indicated above the reactive olefinic double bond in the polyolefin wax molecule can be a terminal, vinylidene, or internal type of double bond. The addition product is termed a phosphonate ester of a polyolefin wax which, as indicated above, includes thiophosphonate esters.

It should be noted that the process for preparing these polyolefin wax-phosphite adducts offers several advantages over prior processes. For example, because the addition reaction is conducted with a polyolefin wax, rather than thermally degrading high molecular weight polyethylene in the reaction mass, reaction times are reduced considerably and decomposition of the alkyl phosphite is avoided. Quite unexpectedly, it was found that by using the process of this invention it is possible to obtain a polyolefin wax-phosphite adduct which differs in kind from the product of the prior process in that substantially all of the olefinic double bonds present in the polyolefin wax were reacted with the alkyl phosphite whereas with the prior process a much lower percentage of double bonds are reacted thus accounting for the vast difference between the products.

It has been unexpectedly discovered that the polyolefin wax-phosphite adducts, or phosphonate esters, while difficultly emulsifiable, can be rendered readily emulsifiable to fine particle size, stable emulsions according to this invention by converting at least about 25%, and preferably about 50% of the oxyalkyl groups attached to the phosphorus atoms in the polyolefin wax-phosphite adduct to hydroxyl groups. This conversion can be shown as follows:

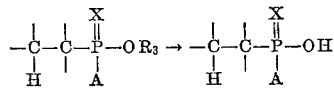

wherein A, R$_3$, and X are as defined previously. The converted product can be termed a modified polyolefin wax-phosphite adduct and conversion can be accomplished by acid hydrolysis, base hydrolysis or pyrolysis.

Hydrolysis can be carried out in a solvent for the polyolefin wax-alkyl phosphite adduct or in the heated wax adduct itself. Acid hydrolysis can be accomplished using monovalent acids such as hydrochloric acid, chloroacetic acid, and the like. Polyvalent acids such as sulfuric acid, phosphoric acid, and the like can be used to hydrolyze but the salt by-products must be washed out before emulsification. Basic hydrolysis can be accomplished using bases such as alkali metal hydroxides such as potassium hydroxide, sodium hydroxide and the like, and aqueous ammonia and the like. It should be understood that basic hydrolysis produces a salt which itself is readily emulsifiable. Thus as used herein the phrase "hydroxyl groups" is intended to include the salts thereof as well.

A preferred method for converting the oxyalkyl groups to hydroxy groups is by pyrolysis. Pyrolysis is carried out either in batch or continuously in suitable apparatus at a temperature of from about 280° C. to about 475° C. for a period of time sufficient to accomplish the aforementioned degree of conversion. It has been found that a methyl phosphite modified polyolefin wax will not undergo pyrolysis and this wax adduct must be hydrolyzed to convert the oxymethyl groups to hydroxyl groups. The pyrolysis method of conversion is preferred because it provides for a high conversion rate, uses low cost equipment, does not require a catalyst, and does not require an additional reagent as in hydrolysis thus eliminating blending problems. The by-product of the pyrolysis reaction is the alkene corresponding to the $R_3$ or $R_4$ alkyl group.

The modified polyolefin wax-phosphite adducts which have about 25% of their oxyalkyl groups converted to hydroxyl groups are readily emulsifiable by conventional emulsion techniques to fine particle size, stable emulsions.

Typically the emulsions are prepared by melting the modified polyolefin wax-phosphite adduct and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrotonic, vinylacetate, methylacrylic, tiglic, angelic, senecioic, hexenic, tetracrylic, hypogeic, oleic, elaidic, erucic, brassidic, propynoic, tetrolic, 2-butynoic, pentinoic, 2-pentinoic, amylpropiolic, palmitotic, stearolic, behenolic, sorbic, linoleic and linolinic acids. These acids have the general formula:

$$C_nH_{(2n+x)}COOH$$

wherein $n$ is an integer from 0 to 32 and $x$ is an odd number from $-5$ to $+1$ with the proviso that when $n=0$, $X=+1$. An amine is then added such as mono- and triethanolamine, monoisopropanolamine, diisopropanolamine, triisopropanolamine, morpholine, N,N-dimethylethanolamine and N,N-diethylethanolamine. The mixture is stirred until thoroughly mixed or until it becomes clear. Water which has been heated to just below the boiling point is added with additional stirring. The mixture is then vigorously agitated in a suitable device, e.g., a bladed mixer, colloid mill or other shear producing apparatus to form the emulsion. Stable emulsions are obtained which generally vary less than 1% in solids content after standing in a separatory funnel for one week. A wax adduct solids content of from 5 to 50% is preferred in these emulsions.

The emulsions can also be prepared using ethoxylated fatty amines and acetic acid and with sodium alkyl sulfates (tergitols) and similar non-ionic emulsifiers.

Many modifications can be made in the present invention without departing from the spirit and scope thereof. For example modified adducts can be prepared and emulsified as described herein from higher molecular weight polymers (those having a molecular weight greater than about 5,000) containing ethylenic unsaturation as for example copolymers of ethylene and butadiene and the like. It is also possible to employ other phosphites than those described herein, for instance polyalkyleneoxide phosphites and the like.

The modified polyolefin wax-phosphite adducts of this invention are useful in the preparation of wax emulsions which can be used as decorative and protective coatings for a wide variety of surfaces ranging from floor and wall tiles to shoe leathers and car polish. The modified adducts of this invention are also useful for promoting adhesion between various substrates and especially inert polymeric surfaces such as polyethylene. They are also useful as an additive in conventional printing ink formulations to improve ink adhesion to various surfaces especially polymeric surfaces. Furthermore, the modified adducts are useful as finishing agents for fibers and textiles.

Other ingredients can be added to the emulsions prepared according to this invention. For example, there can be included abrasives such as bentonite and tripoli, silicone oils such as methyl silicone, mineral spirits, clay and other fillers, colorants, extenders and modifiers.

The following examples are intended to further illustrate the present invention without limiting the same in any manner. All parts and percentages are by weight unless indicated otherwise.

EXAMPLES 1–21

General procedure—Using a solvent

Into a 500 ml. flask equipped with a stirrer, thermometer, condenser and dropping funnel was placed 200 grams of polyethylene wax prepared by pyrolyzing at 480° C. polyethylene having a density of 0.96 and a melt index (ASTM D–1238–57T) of 5. The wax had a number average molecular weight of 2,000 and contained an average of one olefinic double bond per polymer molecule, over 90 percent of which were terminal vinyl groups. Chlorobenzene and diethyl hydrogen phosphite were added to the wax in the flask and the reaction mass was heated to reflux at 169° C. A solution of a peroxide initiator was then added over about three minutes and the reaction mass was refluxed for the reaction time. Thereafter chlorobenzene and excess diethyl hydrogen phosphite were removed by vacuum distillation. The polyethylene wax-phosphite adduct was allowed to cool. The amount of reaction was determined by measuring the change in the vinyl double bond absorption of 11.02μ in the infrared. The product was a hard, white wax with absorptions in the infrared at 8.00μ, 8.59μ, 9.44μ and 9.67μ characteristic of an alkyl phosphonate ester. Results are summarized below.

| Example No. | Diethyl hydrogen phosphite, grams | Peroxide initiator, grams | Chlorobenzene, ml. | Reaction time | Percent reaction |
|---|---|---|---|---|---|
| 1 | 20 | ¹ 1.0 | 200 | 4 hrs | 50 |
| 2 | 40 | ¹ 1.0 | 200 | 4 hrs | 100 |
| 3 | 40 | ¹ 1.0 | 200 | 1.5 hrs | 83 |
| 4 | 40 | ¹ 1.0 | 50 | 30 min | 100 |
| 5 | 40 | ¹ 0.5 | 50 | 20 min | 90 |
| 6 | 25 | ¹ 0.5 | 40 | 20 min | 68 |
| 7 | 25 | ¹ 1.0 | 40 | 10 min | 86 |
| 8 | 25 | ¹ 1.0 | 40 | 5 min | 86 |
| 9 | 18 | ¹ 1.0 | 40 | 20 min | 75 |
| 10 | 16 | ¹ 1.0 | 40 | 20 min | 65 |
| 11 | 20 | ² 1.0 | 200 | 2 hrs | 45 |
| 12 | 40 | ² 1.0 | 200 | 2 hrs | 67 |
| 13 | 25 | ² 1.0 | 40 | 1 hr | 58 |
| 14 | 25 | ² 1.0 | 80 | 30 min | 62 |
| 15 | 25 | ³ 1.0 | 40 | 55 min | 100 |
| 16 | 25 | ³ 0.5 | 40 | 20 min | 100 |
| 17 | 20 | ³ 0.5 | 40 | 20 min | 100 |
| 18 | 18 | ³ 0.5 | 40 | 20 min | 94 |
| 19 | 16 | ³ 0.5 | 40 | 20 min | 85 |
| 20 | 16 | ³ ⁴ 0.5 | 40 | 20 min | 85 |
| 21 | 18 | ³ 0.5 | 40 | 5 min | 50 |

¹ 2,5-dimethyl-2,5-di-(t-butoxy)-hexyne-3.
² Dicumyl peroxide.
³ Di-t-butyl peroxide.
⁴ Peroxide was added over 10 minutes.

EXAMPLES 22–24

General procedure—In the melt

Into a 500 ml. flask equipped with a stirrer and thermometer was placed 200 grams of the polyethylene wax described in Examples 1–21, diethyl hydrogen phosphite, and a peroxide initiator. The reaction mass was heated to the reaction temperature and held there with stirring for the reaction time. Excess diethyl hydrogen phosphite was removed by vacuum distillation. The product was a hard, white wax. Percent reaction was determined as in Examples 1–21. Results are summarized below:

| Example No. | Diethyl hydrogen phosphite, grams | Peroxide initiator, grams | Reaction Temperature (° C.) | Reaction time | Percent reaction |
|---|---|---|---|---|---|
| 22 | 40 | ¹ 0.1 | 130–135 | 2 hrs | 40 |
| 23 | 40 | ¹ 0.5 | 130–140 | 1.5 hrs | 55 |
| 24 | 40 | ² 0.5 | 170–175 | 30 min | 75 |

¹ 2,5-dimethyl-2,5-di-(t-butoxy)-hexyne-3.
² Di-t-butyl peroxide.

EXAMPLES 25–30

General procedure—In the melt

Into a 2,000 ml. flask equipped with a thermometer, dropping funnel, condenser, and stirrer was placed 1,000 grams of polyethylene wax described in Examples 1–21. The wax was heated and a solution of di-t-butyl peroxide in diethyl hydrogen phosphite was added. The reaction mass was stirred for the reaction time and the reaction temperature and excess phosphite removed by vacuum distillation. The product was a hard, white wax. Percent reaction was determined as in Examples 1–21. Results are summarized below:

| Example No. | Diethyl hydrogen phosphite, grams | Di-t-butyl peroxide, grams | Reaction temperature (° C.) | Reaction time (min.) | Percent reaction |
|---|---|---|---|---|---|
| 25 | 90 | 2.5 | 170 | [1] 45 | 100 |
| 26 | 60 | 2.5 | 180 | [2] 15 | 92 |
| 27 | 60 | 2.5 | 190 | [2] 10 | 90 |
| 28 | 60 | 2.5 | 200 | [2] 10 | 79 |
| 29 | 84 | 2.5 | 180 | [2] 15 | 100 |
| 30 | 90 | 2.5 | 180 | [2] 15 | 100 |

[1] Peroxide added over 30 minutes.
[2] Peroxide added over 5 minutes.

EXAMPLE 31

Into a 5,000 ml. flask equipped with a stirrer, condenser, thermometer, and dropping funnel there was placed 2,000 g. of a 0.88 density directly polymerized low density polyethylene. This material had a molecular weight of ~2,500 and an average of about one-half of a double bond per polymer molecule. Most of the double bonds were of the vinylidene type but some internal and terminal type double bonds were also present. A mixture of 350 ml. of chlorobenzene and 180 g. of diethyl hydrogen phosphite were added and the mixture heated to reflux. A solution of 5 g. of di-t-butyl peroxide in 50 ml. of chlorobenzene was added rapidly and the mixture refluxed for 1 hour. After removal of the chlorobenzene and excess phosphite under vacuum, the product was cooled. Its infrared spectrum no longer exhibited any double bond absorption but did have characteristic alkyl phosphonate absorptions.

EXAMPLE 32

Example 31 was duplicated using only 275 ml. of chlorobenzene and 90 g. of diethyl hydrogen phosphite with a 20 min. reaction time. The reaction was again complete.

EXAMPLE 33

Example 18 was duplicated using a 0.93 density polyethylene wax prepared by the pyrolysis of a high molecular weight 0.92 density polyethylene resin. The wax had an average of 1.0 double bond per molecule and an average molecular weight of 2,000. Most of the double bonds were vinyl. The product was completely reacted as evidenced by its infrared spectrum which showed no residual double bond absorptions.

EXAMPLE 34

Into a 2,000 ml. flask equipped with a stirrer, condenser, dropping funnel, and thermometer there was placed 600 g. of a low molecular weight ethylene-propylene copolymer prepared by the pyrolysis of a high molecular weight copolymer. The material contained an average of 1 double bond per molecule, most of which were of the vinylidene type. To the polymer there was added 105 ml. of chlorobenzene and 54 g. of diethyl hydrogen phosphite and the mixture heated to reflux. A solution of 1.5 g. of di-t-butyl peroxide in 15 ml. of chlorobenzene was then added and the reaction mixture was refluxed for 20 minutes at which point the solvent and excess phosphite were removed under vacuum. The infrared spectrum of the residual tacky syrup showed a considerable reduction (<95%) in the double bond absorptions.

EXAMPLE 35

Into a 500 ml. flask equipped with a stirrer, thermometer, condenser, and dropping funnel there was placed 100 g. of an 0.96 density, low molecular weight polyethylene prepared by direct polymerization of polyethylene using a silylchromate catalyst described in Belgian Patent 637,740, 17 ml. of chlorobenzene and 9 g. of diethyl hydrogen phosphite. The mixture was heated to reflux and 0.25 g. of di-t-butyl peroxide in 3 ml. of chlorobenzene was added. The mixture was refluxed for 20 minutes at which point it was poured into a large volume of acetone. The precipitated wax was filtered, washed with acetone, and dried. Its infrared spectrum showed none of the original vinyl absorption at 11.02µ indicating complete reaction.

EXAMPLE 36

Using the apparatus and technique described in Example 18, 200 g. of the wax described in Examples 1–21 was reacted with 15 g. of dimethyl hydrogen phosphite. The infrared spectrum of the product had essentially no vinyl absorption indicating virtually complete reaction.

EXAMPLE 37

Example 36 was duplicated using 33 g. of di-n-butyl hydrogen phosphite in place of the dimethyl hydrogen phosphite. The infrared spectrum of the product indicated over 90% of reaction.

EXAMPLE 38

Into a 250 ml. flask there was placed 40 g. of the wax described in Examples 1–21, 10.4 g. of dilauryl hydrogen phosphite and 7 ml. of chlorobenzene. The mixture was heated to reflux and 0.1 g. of di-t-butyl peroxide in 5 ml. of chlorobenzene was added. The mixture was refluxed for 20 minutes and then poured into a large volume of acetone. After filtration and washing with additional acetone the product was dried. Its infrared spectrum indicated 84% of reaction to have occurred.

EXAMPLE 39

A mixture of 200 g. of the polyethylene wax described in Examples 1–21, 100 ml. of chlorobenzene and 75 g. of di(polyalkyleneoxide) hydrogen phosphite of methoxy polyethylene glycol having a molecular weight of 350 was heated to reflux in a 1,000 ml. flask and a solution of 0.5 g. of di-t-butyl peroxide in 5 ml. of chlorobenzene was added. After 1.5 hours of reflux the mixture was poured into a large volume of acetone. The infrared spectrum of the product showed 42% reaction.

EXAMPLE 40

Example 25 is duplicated using n-hexadecyl dihydrogen phosphite in place of diethyl hydrogen phosphite. The product is a hard white wax and infrared spectrum shows substantially complete reaction.

EXAMPLE 41

Example 4 is duplicated using n-butyl dihydrogen phosphite in place of diethyl hydrogen phosphite. The product is a hard white wax and infrared spectrum shows substantially complete reaction.

EXAMPLE 42

Example 2 is duplicated using ethyl dihydrogen thiophosphite in place of diethyl hydrogen phosphite. The product is a hard wax and infrared spectrum shows substantially complete reaction.

EXAMPLE 43

Example 29 is duplicated using di-n-heptyl hydrogen thiophosphite in place of diethyl hydrogen phosphite. The product is a hard wax and infrared spectrum shows substantially complete reaction.

Control I

This experiment was carried out in a 2″ pyrolyzing extruder. Residence times in the extruder were of the order of 10 minutes. The product was cooled as it left the extruder by being run into cold water. A mixture of 5 melt index, 0.96 density polyethylene resin and 6% of diethyl hydrogen phosphite was fed to the extruder. The pyrolyzing zones of the extruder were at 390° C. while the remaining zones were at 300° C. The product of the pyrolysis was a brown, malodorous wax. Its infrared spectrum showed no absorptions indicative of the presence of the phosphonate ester groups. The product had a pronounced vinyl absorption. When the resin was pyrolyzed under the above conditions in the absence of phosphite a white extrudate was obtained.

Control II

The experiment described in Control I was repeated at 375° C. using 0.2% of di-t-butyl peroxide in the feed mixture. The product had weak infrared absorptions at $8.5\mu$, $9.00\mu$ and at $10.00\mu$. No vinyl absorption was present. The product was not emulsifiable and, was not particularly degraded in molecular weight. In was discolored and malodorous.

EXAMPLE 44

Preparation of modified polyolefin wax—Phosphite adducts hydroylsis

In an Erlenmeyer flask 110 g. of the phosphite adduct described in Example 2 was dissolved in 250 ml. of refluxing chlorobenzene and a solution of 7 g. of KOH in methanol was added. The mixture was boiled for 10 minutes and then poured into a large volume of cold methanol. The infrared spectrum of the precipitated product showed the $8.00\mu$ band to have shifted to $8.35\mu$ and the doublet at $9.44\mu$ and $9.67\mu$ to have shifted to $9.30\mu$ and $9.39\mu$ indicating that hydrolysis had occurred. The product emulsified readily by the procedure described in Example 52 below.

EXAMPLE 45

To 40 g. of stirred phosphite adduct prepared in Example 6 and heated to 150° C. there was added, over 35 minutes, 5 ml. of concentrated HCl. The product was then poured into water and filtered. Its infrared spectrum showed the $8.00\mu$ band to have shifted to $8.35\mu$ indicating hydrolysis to have occurred.

EXAMPLE 46

To 800 g. of phosphite adduct prepared by the method of Example 31 and heated at 150° C. there was added, over 50 minutes, a solution of 20 ml. of concentrated HCl in 30 ml. of water. The water and HCl were allowed to distill off during the addition. The infrared spectrum of the product showed complete reaction to have occurred based on the shift of the $8.00\mu$ absorption to $8.35\mu$.

EXAMPLE 47

40 g. of the product of Example 5 was heated at 150–160° C. for 30 minutes with a solution of 3 g. of KOH in 3 ml. of H$_2$O. The infrared spectrum of the product resembles that of Example 44.

EXAMPLE 48

Pyrolysis

One hundred grams of phosphite adduct prepared according to Example 18 was heated under a nitrogen stream to 340° C. Gas evolution began at 280° C. and became more vigorous as the temeprature increased. The wax was cooled rapidly. Its infrared spectrum showed the original $8.00\mu$ phosphoryl absorption band to have shifted to $8.5\mu$. The product emulsified well using the method of Example 52.

EXAMPLE 49

A sample of phosphite adduct prepared according to the method of Example 18 was fed through a 12″ pyrolysis tube by means of a 1″ NRM extruder. The residence time in the tube was the order of 2 minutes at 350° C. The product resembled the product of Example 48.

EXAMPLE 50

Example 49 was repeated using wax-phosphite adduct prepared according to Example 32. The same spectral changes were observed and the product emulsified using the method of Example 52.

EXAMPLE 51

Example 49 was repeated at a higher throughput rate so that only about 40% conversion occurred. The product was easily emulsifiable.

EXAMPLE 52

Emulsification of modified polyolefin wax—
Phosphite adducts

Emulsions were prepared in a 500 ml. stainless steel vessel equipped with a stirrer, thermometer and inlet tube and capable of being heated with pressurized steam and cooled with hot or cold water. A mixture of 100 g. of wax prepared according to Example 49, 20 g. of oleic acid, 20 g. of morpholine and 40 g. of distilled water was placed in the vessel and the vessel closed. The mixture was heated with stirring for 30 minutes at which point 260 ml. of distilled water was pumped into the vessel with temperature being maintained at 140° C. The mixture was stirred at 140° C. for about 20 minutes after all of the water had been added and then cooled. A fine particle size, stable emulsion was obtained. The particle size was of the order of 250–300 A. After standing for one week, the emulsion varied less than 1% in solids content.

EXAMPLE 53

Example 52 was repeated using the wax prepared in Example 50 with similar results. After standing for one week, the emulsion varied less than 1% in solids content.

EXAMPLE 54

Using the equipment described in Example 52 a mixture of 100 g. of the wax prepared in Example 49, 35 g. of Ethomeen T–15, 3.5 g. of acetic acid, and 38 g. of distilled water was heated at 150° C. for 30 minutes at which point 352 g. of water was pumped in. The temperature was maintained at 140° C. After stirring at 140° C. for 20 minutes the emulsion was cooled. A very fine particle size, stable emulsion was obtained. After standing for one week, the emusion varied less than 1% in solids content.

EXAMPLE 55

Into the apparatus described in Example 52 there was placed 80 g. of material prepared in Example 49, 18.4 g. of Tergitol NP–14, 3.2 g. of Tergitol NP–27, 8 g. of morpholine, and 42 ml. of distilled water. The mixture was heated at 140° C. for 30 minutes and then 308 g. of water was pumped in with the temperature maintained at 140° C. The mixture was then cooled immediately. A stable, white, fine particle size emulsion was obtained. After standing for one week, the emulsion varied less than 1 percent in solids content.

EXAMPLE 56

The adduct of Example 42 is hydrolyzed as described in Example 44 and emulsified as described in Example 52 to yield a fine particle size, stable emulsion.

EXAMPLE 57

The adduct of Example 43 is pyrolyzed as described in Example 49 and emulsified as described in Example 52 to yield a fine particle size, stable emulsion.

Control III

The unmodified adduct prepared in Example 2 was subjected to the emulsion procedure of Example 52. However, this adduct did not emulsify but instead formed a fine dispersion which creamed (separated) on standing.

We claim:

1. Modified polyolefin wax-alkyl phosphite adduct emulsifiable to fine particle size, stable emulsions comprising an alpha mono-olefinically unsaturated hydrocarbon homopolymer or copolymer wax having an average of at least about one-half of an olefinic double bond per polymer molecule, a molecular weight of from about 1,000 to about 5,000, and at least about 25 percent of its olefinic double bonds reacted in the liquid phase at a temperature of from about 130° C. to about 200° C. with an alkyl phosphite having from 1 to 32 carbon atoms inclusive and at least one hydrogen atom capable of entering into a free radical addition reaction with an olefinic double bond without decomposing said alkyl phosphite and wherein at least about 25 percent of the oxyalkyl groups containing from 1 to 32 carbon atoms inclusive attached to phosphorus atoms are converted to hydroxyl groups or the salt thereof after removing any excess alkyl phosphite by acid or basic hydrolysis or by pyrolysis at a temperature of from about 280° C. to about 475° C.

2. Modified polyolefin wax-alkyl phosphite adduct emulsifiable to fine particle size, stable emulsions comprising an alpha mono-olefinically unsaturated hydrocarbon homopolymer or copoylmer wax having an average of at least about one olefinic double bond per polymer molecule, a molecular weight of from about 1,000 to about 5,000, and at least about 50 percent of its olefinic double bonds reacted in the liquid phase at a temperature of from about 130° C. to about 200° C. with an alkyl phosphite having the formula

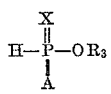

wherein X represents an atom selected from the group of oxygen and sulfur, R₃ represents an alkyl group having from 1 to 16 atoms inclusive and A represents a member of the group of hydrogen and —OR₄ wherein R₄ is an alkyl group having from 1 to 16 carbon atoms inclusive without decomposing said alkyl phosphite, and wherein at least about 50 percent of the oxyalkyl groups containing from 1 to 32 carbon atoms inclusive attached to phosphorus atoms are converted to hydroxyl groups or the salt thereof after removing any excess alkyl phosphite by acid or basic hydrolysis or by pyrolysis at a temperature of from about 280° C. to about 475° C.

3. Modified polyolefin wax-alkyl phosphite adduct of claim 1 wherein said phosphite has the formula

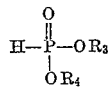

wherein R₃ and R₄ each represent on alkyl group having from 1 to 16 carbon atoms inclusive.

4. Process for preparing a modified polyolefin wax-alkyl phosphite adduct emulsifiable to fine particle size, stable emulsions which comprises reacting in the liquid phase an alpha mono-olefinically unsaturated hydrocarbon homopolymer or copolymer wax having an average of at least about one-half of an olefinic double bond per polymer molecule and a molecular weight of from about 1,000 to about 5,000 with an alkyl phosphite other than methyl phosphite having from 2 to 32 carbon atoms inclusive and at least one hydrogen atom capable of entering into a free radical addition reaction with an olefinic double bond at a temperature of from about 130° C. to about 200° C. such that said alkyl phosphite is not decomposed and at least about 25 percent of said olefinic double bonds are reacted with said alkyl phosphite to form an adduct thereof, removing any excess alkyl phosphite and thereafter converting at least about 25 percent of the oxyalkyl groups containing from 2 to 32 carbon atoms inclusive attached to phosphorus atoms to hydroxyl groups by pyrolyzing said adduct at a temperature of from about 280° C. to about 475° C.

5. Process of claim 4 wherein said alkyl phosphite has the formula

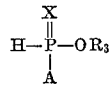

wherein X represents an atom selected from the group of oxygen and sulfur, R₃ represents an alkyl group having from 2 to 16 carbon atoms inclusive and A represents a member of the group of hydrogen and —OR₄ wherein R₄ is an alkyl group having from 2 to 16 carbon atoms inclusive.

6. Process of claim 4 wherein at least about 50 percent of said olefinic double bonds are reacted with said alkyl phosphite.

7. Process of claim 4 wherein said wax has an average of at least about one olefinic double bond per polymer molecule.

8. Process of claim 4 wherein said reaction is carried out in an inert liquid solvent.

9. Process of claim 4 wherein said wax is a crystalline wax.

10. Process of claim 4 wherein at least about 50 percent of said oxyalkyl groups are converted to hydroxyl groups.

11. Process of claim 4 wherein substantially all of said oxyalkyl groups are converted to hydroxyl groups.

12. Process of claim 5 wherein said alkyl phosphite has the formula

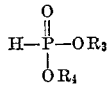

References Cited

UNITED STATES PATENTS

| | | | |
|---|---|---|---|
| 2,724,718 | 11/1955 | Stiles et al. | 260—970 |
| 2,863,834 | 12/1958 | Buckmann | 260—970 XR |
| 3,105,819 | 11/1963 | Anderson | 260—932 XR |

CHARLES B. PARKER, *Primary Examiner.*

ANTON H. SUTTO, *Assistant Examiner.*

U.S. Cl. X.R.

8—115.5; 106—20, 243, 271; 204—159.11; 260—502.4, 970, 983